United States Patent
Carle et al.

(10) Patent No.: US 9,598,108 B2
(45) Date of Patent: Mar. 21, 2017

(54) MULTI-CHAMBER PROFILE HAVING AN INSERT PART FOR FIXING AN ATTACHMENT PART

(71) Applicant: AUDI AG, Ingolstadt (DE)

(72) Inventors: Klaus-Dieter Carle, Heilbronn (DE); Karlheinz Schäfer, Weinsberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/893,412

(22) PCT Filed: May 20, 2014

(86) PCT No.: PCT/EP2014/001346
§ 371 (c)(1),
(2) Date: Nov. 23, 2015

(87) PCT Pub. No.: WO2014/187557
PCT Pub. Date: Nov. 27, 2014

(65) Prior Publication Data
US 2016/0107692 A1    Apr. 21, 2016

(30) Foreign Application Priority Data

May 24, 2013   (DE) .................. 10 2013 008 913

(51) Int. Cl.
*B60K 37/00*   (2006.01)
*B62D 21/02*   (2006.01)
(Continued)

(52) U.S. Cl.
CPC .......... *B62D 21/02* (2013.01); *B62D 27/065* (2013.01); *B62D 21/00* (2013.01); *B62D 25/00* (2013.01);
(Continued)

(58) Field of Classification Search
CPC .......... B29C 45/2737; B29C 2045/277; B29C 2045/2889; B29C 45/2806; B29C 47/0023;
(Continued)

(56) References Cited

U.S. PATENT DOCUMENTS 4,018,466 A * 4/1977 Norlin .................. B60R 19/18
293/122
4,027,987 A * 6/1977 Berkowitz ............ F16B 7/0446
403/172
(Continued)

FOREIGN PATENT DOCUMENTS

CN   1884856           12/2006
DE   EP 0 841 240 A2   5/1998
(Continued)

OTHER PUBLICATIONS

International Search Report issued by the European Patent Office in International Application PCT/EP2014/001346.
(Continued)

*Primary Examiner* — Kiran B Patel
(74) *Attorney, Agent, or Firm* — Henry M. Feiereisen LLC

(57) ABSTRACT

A hollow profile has at least one internal partition for forming chambers, in which, in order to fix an attached part to the hollow profile, an insert part is arranged in a mounting position within one chamber, and the insert part has a connecting means for producing a connection to the attached part. The insert part is formed as a multi-chamber profile having a profile direction extending perpendicular to the profile direction of the hollow profile and perpendicular to the partition, for an interface of the insert part, resting on an outer boundary wall of the hollow profile, to have a journal-like connecting flange which, in order to fix the insert part in the mounting position, engages with a form fit in a (Continued)

through opening in the boundary wall. The insert part is formed with a length in the profile direction of the insert part so as to enable insertion of the insert part into the chamber of the hollow profile and for positioning the same in the mounting position.

8 Claims, 2 Drawing Sheets

(51) Int. Cl.
*B62D 27/06* (2006.01)
*B62D 21/00* (2006.01)
*B62D 25/00* (2006.01)
*F16B 7/18* (2006.01)
*F16B 37/04* (2006.01)
*F16B 37/06* (2006.01)

(52) U.S. Cl.
CPC ............... *F16B 7/18* (2013.01); *F16B 37/045* (2013.01); *F16B 37/061* (2013.01)

(58) Field of Classification Search
CPC .... A63B 2053/0416; A63B 2053/0425; A63B 2053/0458; A63B 2053/0462; A63B 2209/023
USPC .................................... 296/205, 203.01, 204
See application file for complete search history.

(56) References Cited

U.S. PATENT DOCUMENTS

| | | | | |
|---|---|---|---|---|
| 5,059,056 A * | 10/1991 | Banthia | ............... | A47B 47/0008 296/203.01 |
| 5,228,259 A * | 7/1993 | Haddad | ............... | B62D 23/005 403/170 |
| 5,397,115 A * | 3/1995 | Vlahovic | ............. | B62D 29/008 296/205 |
| 5,458,393 A * | 10/1995 | Benedyk | ............. | B62D 23/005 280/798 |
| 5,778,598 A * | 7/1998 | Ohanesian | .......... | B29C 47/0023 49/403 |
| 6,047,988 A * | 4/2000 | Aloe | ........................ | B60G 7/02 280/124.134 |
| 6,165,588 A * | 12/2000 | Wycech | .................. | B29C 44/18 293/109 |
| 6,241,310 B1 * | 6/2001 | Patelczyk | ............ | B62D 23/005 296/203.01 |
| 6,247,869 B1 * | 6/2001 | Lichvar | .................. | F16L 47/00 285/179.1 |
| 6,382,709 B1 * | 5/2002 | Chirifu | ................ | B62D 35/007 180/903 |
| 6,402,414 B1 * | 6/2002 | Kanodia | ................ | C09D 11/17 401/196 |
| 6,470,990 B1 * | 10/2002 | Panoz | .................... | B62D 23/00 180/311 |
| 6,866,331 B2 * | 3/2005 | Kropfeld | ............. | B62D 29/002 296/146.6 |
| 7,063,376 B2 * | 6/2006 | Ori | ......................... | B62D 25/08 296/187.01 |
| 7,077,460 B2 * | 7/2006 | Czaplicki | ............... | B29C 44/18 296/187.02 |
| 7,614,658 B2 * | 11/2009 | Yamada | ............... | B62D 21/152 280/784 |
| 8,272,682 B2 * | 9/2012 | Cimatti | ................ | B62D 25/025 296/204 |
| 8,627,632 B2 * | 1/2014 | Werner | ...................... | F24J 2/14 52/633 |
| 8,690,218 B2 | 4/2014 | Kühl et al. | | |
| 8,844,987 B2 * | 9/2014 | Kaneko | ................... | B60R 19/34 293/133 |
| 8,898,967 B2 * | 12/2014 | Bartelt-Muszynski | | F24J 2/5203 136/251 |
| 2002/0027379 A1 * | 3/2002 | Czaplicki | ............... | B62D 25/04 296/187.02 |
| 2004/0262931 A1 * | 12/2004 | Roussel | .................. | B60R 19/18 293/120 |
| 2006/0214439 A1 * | 9/2006 | Reynolds | ................ | B60R 19/18 293/132 |
| 2006/0249962 A1 * | 11/2006 | Gonzalez | ............... | B60R 19/34 293/133 |

FOREIGN PATENT DOCUMENTS

| | | |
|---|---|---|
| DE | EP 0 937 630 A2 | 8/1999 |
| DE | EP 1 566 327 A2 | 8/2005 |
| DE | EP 1 426 241 B1 | 10/2007 |
| DE | 10 2007 019699 A1 | 10/2008 |
| DE | EP 2 187 070 A1 | 5/2010 |
| DE | 10 2010 014513 A1 | 10/2011 |
| FR | 2 814 426 A1 | 3/2002 |
| WO | WO 2012/013303 | 2/2012 |

OTHER PUBLICATIONS

Chinese Search Report issued on Nov. 1, 2016 with respect to counterpart Chinese patent application 201480029692.0.
Translation of Chinese Search Report issued on Nov. 1, 2016 with respect to counterpart Chinese patent application 201480029692.0.

* cited by examiner

MULTI-CHAMBER PROFILE HAVING AN INSERT PART FOR FIXING AN ATTACHMENT PART

CROSS-REFERENCES TO RELATED APPLICATIONS

This application is the U.S. National Stage of International Application No. PCT/EP2014/001346, filed May 20, 2014, which designated the United States and has been published as International Publication No. WO 20141187557 and which claims the priority of German Patent Application, Serial No. 10 2013 008 913.1, filed May 24, 2013, pursuant to 35 U.S.C. 119(a)-(d).

BACKGROUND OF THE INVENTION

The invention relates to a hollow profile.

In vehicle construction a vehicle body is produced by using, inter alia, longitudinal beams and transverse beams which have to be interconnected and have to have a sufficient stiffness to ensure sufficient vehicle safety in the event of accidents such as frontal or lateral crashes. For this purpose, insert parts are used that are integrated in the beams and serve for connecting further components, so called attachment parts, such as subframes.

For connecting an attachment part to a vehicle body longitudinal beam having a multi-chamber profile, it is known to use a sleeve with a shaft section and a sleeve head. For this the shaft section is guided through the entire cross section, including the chamber-forming partition walls of the multi-chamber profile, from a first outer sidewall to the opposing second outer sidewall of the multi-chamber profile, until the sleeve head abuts the first outer sidewall or optionally the shaft end perforates the second outer sidewall. Such a sleeve can then be welded to the longitudinal beam in the region of the sleeve head and the shaft end where it forms respective connection points for the attachment parts. A disadvantage hereby is that the profile structure of such a multi-chamber profile is damaged, which disadvantageously changes the deformation behavior in the event of a crash.

The generic patent document EP 0 841 240 A2 proposes as solution a hollow profile with two or more chambers into which a sleeve is inserted so as to only traverse an outer chamber or so that at least one chamber remains free. Hereby the sleeve is supported in the interior of the hollow profile on a partition wall between two chambers while not, or only insignificantly, protruding into the neighboring chamber, wherein the sleeve is connected without clearance to the partition wall and the outer boundary wall of the hollow profile via a material-to-material-connection or frictional connection. For connecting the sleeve to the partition wall, the partition wall has a through-opening into which the end of the sleeve is inserted. Due to the through-opening, this solution thus also involves weakening of the partition wall so that also in such a hollow profile the deformation behavior is changed.

SUMMARY OF THE INVENTION

Based on this state of the art, it is an object of the invention to set forth a hollow profile of the aforementioned type which enables a stable and functionally reliable connection between the hollow profile and an attachment part without the adversely affecting the deformation behavior of the hollow profile when using the hollow profile as longitudinal beam of a vehicle body.

This object is solved by a hollow profile with a hollow profile, including: at least one internal partition wall forming a chamber of the hollow profile; and an insert part configured as multi-chamber profile and arranged in a mounting position inside the chamber, wherein the insert part has a profile direction which extends perpendicular to a profile direction of the hollow profile and perpendicular to the partition wall, wherein the insert part has a connection means for forming a connection with an attachment part, to thereby fasten the attachment part on the hollow profile, wherein the insert part has an end face which rests against an outer boundary wall of the hollow profile and a connection flange protruding from the end face and fittingly engaging in a through-opening of the boundary wall, thereby fixing the insert part in the mounting position, and wherein the insert part has a length in the profile direction of the insert part which enables insertion of the insert part into the chamber of the hollow profile and positioning of the insert part in the mounting position.

Such a hollow profile with at least one internal separation wall for forming chambers, in which for fastening an attachment part on the hollow profile an insert part is arranged in a mounting position in a chamber and the insert part has a connecting element for generating a connection with the attachment part, is characterized according to the invention in that the insert part is configured as multi-chamber profile with a profile direction which extends perpendicular to the profile direction of the hollow profile and perpendicular to the partition wall, an end face of the insert part which rests against an outer boundary wall has a cone-shaped connection flange, which for fixing the insert part in the mounting position form fittingly engages in a through-opening of the boundary wall, and the insert part has a length in its section direction that enables insertion of the insert part into the chamber of the hollow profile and its positioning in the mounting position.

With such an insert part, which is insertable into a chamber of the hollow profile, only a single through-opening is required in an outer boundary wall of the hollow profile, whose contour is adjusted to the outer contour of the connection flange of the insert part. Because the diameter of this connection flange can be selected to be significantly smaller than the hollow profile, also the through opening has a correspondingly smaller diameter. This small structural change in the hollow profile leads to the fact that the deformation properties of the hollow profile are not, or only insignificantly, affected.

According to an advantageous embodiment of the invention, the insert part has contact surfaces, which in the mounting position of the insert part rest flat against sidewalls of the chamber that neighbor the boundary wall. This achieves a good force introduction of an attachment part connected with the insert part into the hollow profile. Preferably, in the region of the contact surfaces of the insert part, the sidewalls have at least one fastening opening by means of which the insert part is connected with the hollow profile. Alternatively the connection of the hollow profile with the insert part can also be accomplished with a friction fit and/or material-to-material connection between the contact surfaces of the insert part and the sidewalls of the hollow profile, i.e., for example a screw connection and-or welded connection.

According to a further advantageous embodiment of the invention, the connection means is configured as a connecting bore, which extends in profile direction of the insert part and through the connection flange. Such a connection bore enables for example a secure connection of the attachment part to the hollow profile by means of a screw connection.

According to a further refinement, the insert part is advantageously configured as multi-chamber profile with a cylindrical profile element which receives the connection bore, which profile element is connected with outer sidewalls via web walls so as to form chambers. Preferably hereby the outer sidewalls are configured with the contact surfaces.

Finally according to a last preferred embodiment of the invention the connection flange is configured with an end face which is aligned with the outer surface of the limitation wall, wherein an intermediate disc with a bore which is congruent with the connection bore, is provided, which intermediate disc rests flat on the end face of the connection flange and the outer surface of the boundary wall which surrounds the connection flange.

BRIEF DESCRIPTION OF THE DRAWING

In the following, the invention is described in detail by way of an exemplary embodiment with reference to the included Figures. It is shown in.

DETAILED DESCRIPTION OF PREFERRED EMBODIMENTS

Figure 1:
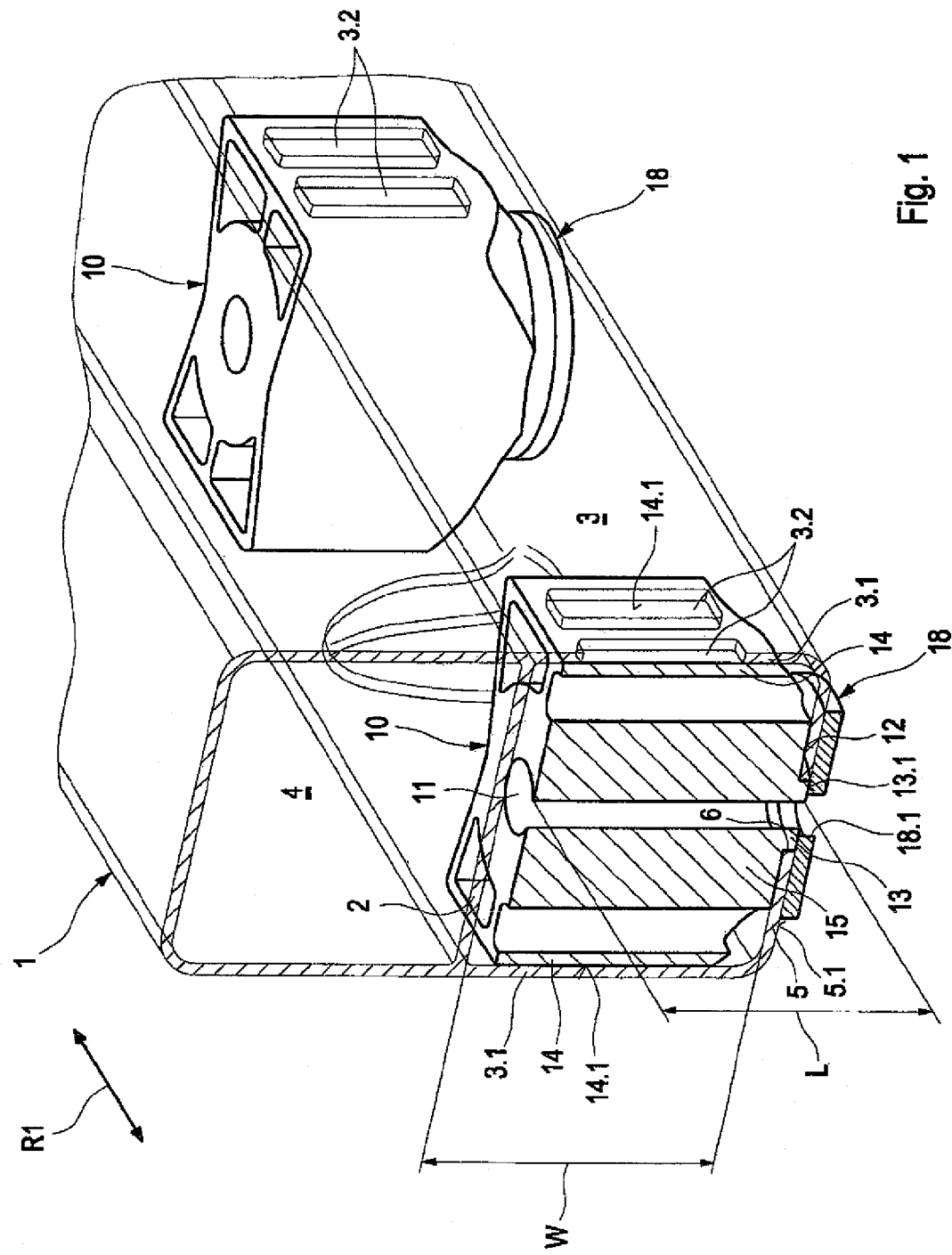
FIG. 1 a perspective partial view of a hollow profile with two insert parts according to the invention including a sectional view, and FIG. 2 a perspective view of an insert part according to FIG. 1.

FIG. 1 shows a hollow profile 1 configured as longitudinal beam, which is divided into two chambers 3 and 4 by means of a partition wall 2, so that this hollow profile 1 represents a multi-chamber hollow profile.

Figure 2:
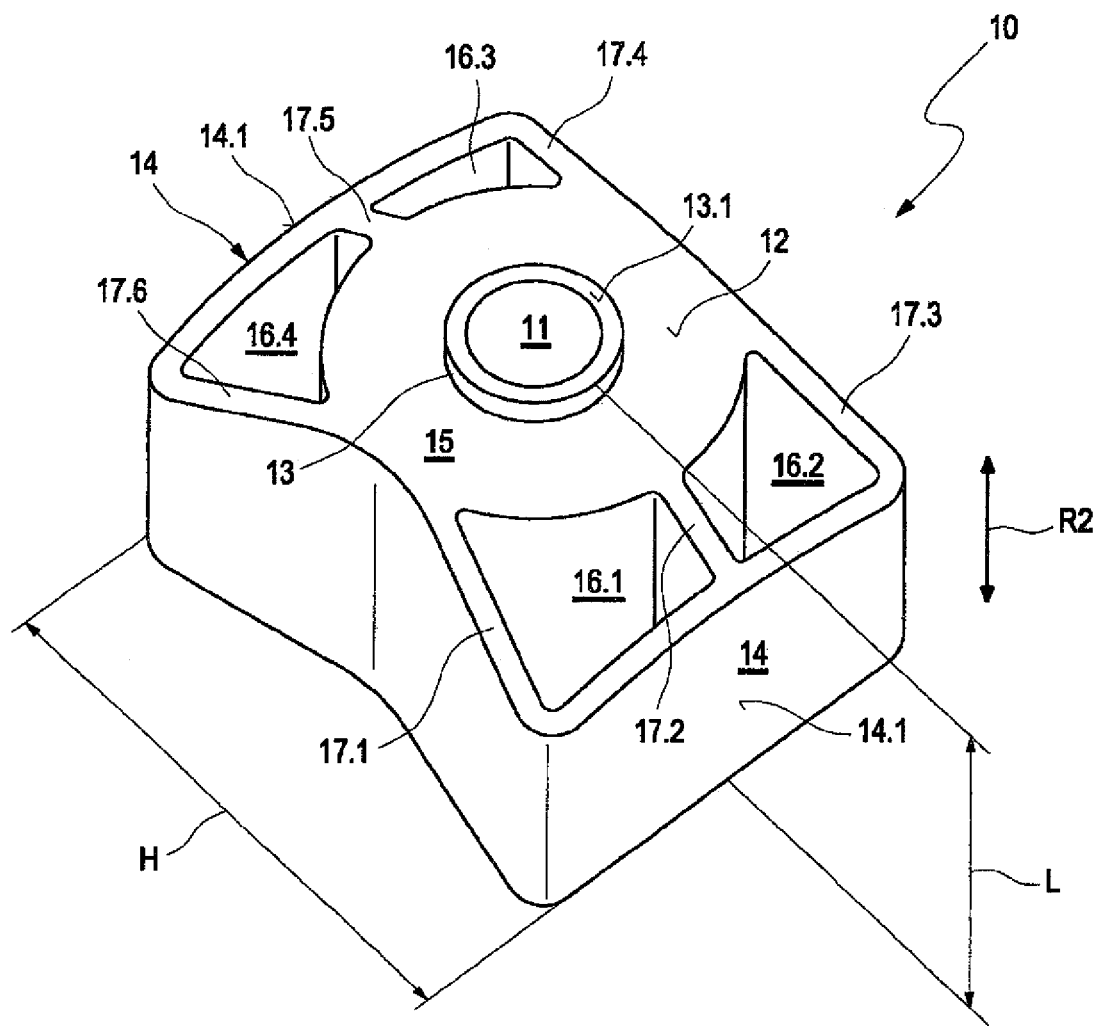

In the chamber 3 of this hollow profile 1, which is delimited by two sidewalls 3.1 and a lower outer boundary wall 5, two insert parts 10 are arranged, wherein one of these two insert parts 10 is shown in a sectional view. FIG. 2 shows a perspective view of such an insert part 10. The hollow profile 1 is shown transparent to better illustrate the insert parts 10.

Such an insert part 10 is configured as multi-chamber profile and extends with its profile direction R2 perpendicular to the profile direction R1 of the hollow profile 1 and perpendicular to the partition wall 2 and the outer boundary wall 5. As multi-chamber profile, this insert part 10 is configured with a central profile element 15, which has a connection bore 11 as connection means, via which an attachment part (not shown in the Figures) can be connected with the hollow profile 1, for example by means of a screw connection. For forming the chambers 16.1, 16.2, 16.3 and 16.4 of the insert part 10, the profile element 15 is connected with an outer boundary wall 14 of the insert part 10 via web walls 17.1, 17.2, 17.3, 17.4, 17.5 and 17.6, wherein the outer surfaces of the two boundary walls 14 each form a respective contact surface 14.1, which rests against the two sidewalls 3.1 of the hollow profile 1 when the insert part 10 is in its mounted position in the chamber 3. With this the insert part 10 is configured to have a height H corresponding to the distance between the two sidewalls 3.1 of the hollow profile 1.

As in particular shown in FIG. 2, the insert part 10 has a connection flange on an end face 12, which connection flange circularly surrounds the connection bore 11 on the profile element 15.

In order to be able to insert such an insert part 10 into the chamber 3 up to the predetermined mounting position, the length L of the insert part 10 corresponds in its profile direction R2 including the connection flange 13 at most to the width W of the chamber 3, i.e., the distance between the partition wall 2 and the outer boundary wall 5.

The mounting position of the insert part 10 in the chamber 3 is characterized in that the connection flange 13 formed on the end face 12 of the insert part 10 traverses a through-opening 6. Therefore the outer diameter of the connection flange 13 corresponds to the diameter of the through-opening 6. Further the height of the connection flange 3 above the end face 12 of the insert part corresponds to the thickness of the outer boundary wall 5 of the hollow profile 1 so that in the mounting position of the insert part 10 the outer end face 13.1 of the connection flange 13 is aligned with the outer surface 5.1 of the limitation wall 5.

This allows insertion of such an insert part 10 into the chamber 3 until reaching the respective mounting position, in which it is fixed by the connection flange 13, which quasi "latchingly" engages in the through-opening 6. A connection with the hollow profile 1 is accomplished by means of fastening openings 3.2 in the sidewalls 3.1 of the chamber 3, which for this purpose are configured as oblong holes which extend in profile direction R2 of the insert part 10, so that via these fastening openings 3.2 and the contact surfaces 14.1 of the insert part 10 a frictional connection for example an adhesive connection or welded connection between the insert part 10 and the hollow profile 1 can be generated.

For mounting an attachment part to the hollow profile 1 by means of the insert part 10, an intermediate disc 18 is provided quasi as "washer". To this end this intermediate disc 18 has a slightly greater bore 18.1 than the diameter of the connection bore 11 and rests on the outer surface 5.1 of the limitation wall 5 so that the bore 18.1 and the connection bore 11 lie on atop each other.

The connection of the insert part 10 with the hollow profile 1 can also be realized without the fastening openings 3.2, in that the contact surfaces 14.1 of the insert part 10 are connected with the sidewalls 3.1 of the hollow profile 1 by means of a screw connection and/or a welded connection.

What is claimed is:

1. A hollow profile, comprising:
at least one internal partition wall forming chambers of the hollow profile; and
an insert part configured as multi-chamber profile and arranged in a mounting position inside one of the chambers, said insert part having a profile direction which extends perpendicular to a profile direction of the hollow profile and perpendicular to the partition wall, said insert part configured to enable a connection of the hollow profile with an attachment part via the insert part,
said insert part having an end face which rests against an outer boundary wall of the hollow profile and a connection flange protruding from the end face and fittingly engaging in a through-opening of the boundary wall, thereby fixing the insert part in the mounting position,
said insert part having a length in the profile direction of the insert part which enables insertion of the insert part into the chamber of the hollow profile and positioning of the insert part in the mounting position.

2. The hollow profile of claim 1, wherein the insert part has contact surfaces, which in the mounting position of the insert part rest substantially flat against sidewalls of the one of the chambers which sidewalls are situated adjacent the boundary wall.

3. The hollow profile of claim 2, wherein the sidewalls have at least one fastening opening provided in a region of the contact surfaces of the insert part for connecting the insert part with the hollow profile.

4. The hollow profile of claim 2, wherein the sidewalls of the one of the chambers are connected with the contact surfaces of the insert part by way of a frictional connection and/or a material-to-material connection.

5. The hollow profile of claim 1, wherein the insert part has a connection bore extending in the profile direction of the insert part and through the connection flange.

6. The hollow profile of claim 5, wherein the insert part has a cylindrical profile element, which receives the connection bore, said cylindrical profile element being connected with outer sidewalls of the insert part via web walls so as to form chambers of the insert part.

7. The hollow profile of claim 6, wherein the outer sidewalls are provided with the contact surfaces.

8. The hollow profile of claim 5, wherein the connection flange has an end face which is aligned with the outer surface of the boundary wall, said hollow profile further comprising an intermediate disc having a bore which coincides with the connection bore, said intermediate disc resting flat on the end face of the connection flange and on the outer surface of the boundary wall surrounding the connection flange.

* * * * *